US008046168B2

(12) United States Patent
Wang et al.

(10) Patent No.: US 8,046,168 B2
(45) Date of Patent: Oct. 25, 2011

(54) SYSTEM AND METHOD FOR DETERMINING POSITION WITHIN OR WITHOUT A COMPLEX POLYGON GEOFENCE

(75) Inventors: Zhengming Wang, Fort Wayne, IN (US); Xianguan Zeng, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 1054 days.

(21) Appl. No.: 11/867,755

(22) Filed: Oct. 5, 2007

(65) Prior Publication Data

US 2009/0093958 A1    Apr. 9, 2009

(51) Int. Cl.
*G01C 21/00* (2006.01)
(52) U.S. Cl. ........................................ 701/214
(58) Field of Classification Search ............ 701/207, 701/214; 340/426.19, 426.22, 995.21
See application file for complete search history.

(56) References Cited

U.S. PATENT DOCUMENTS

| | | | | |
|---|---|---|---|---|
| 5,532,690 | A * | 7/1996 | Hertel | 340/989 |
| 6,438,561 | B1 | 8/2002 | Israni et al. | |
| 6,983,202 | B2 * | 1/2006 | Sanqunetti | 701/207 |
| 7,164,986 | B2 * | 1/2007 | Humphries et al. | 701/207 |
| 7,273,172 | B2 * | 9/2007 | Olsen et al. | 235/385 |
| 7,379,805 | B2 * | 5/2008 | Olsen et al. | 701/50 |
| 7,398,157 | B2 * | 7/2008 | Sigurdsson et al. | 701/213 |
| 7,484,663 | B2 * | 2/2009 | Olsen et al. | 235/385 |
| 7,848,765 | B2 * | 12/2010 | Phillips et al. | 455/456.3 |
| 2005/0159883 | A1 | 7/2005 | Humphries et al. | |
| 2006/0200305 | A1 | 9/2006 | Sheha et al. | |
| 2006/0238340 | A1 | 10/2006 | Harvey | |
| 2007/0115101 | A1 * | 5/2007 | Creekbaum et al. | 340/426.22 |
| 2007/0244633 | A1 * | 10/2007 | Phillips et al. | 701/207 |

OTHER PUBLICATIONS

Bourke, Paul, "Determining If a Point Lies on the Interior of a Polygon," Nov. 1987.

* cited by examiner

*Primary Examiner* — Isam Alsomiri
(74) *Attorney, Agent, or Firm* — Jeffrey P. Calfa; Mark C. Bach

(57) ABSTRACT

A geofence system which locates a position as within or without the complex polygon type geofence using a simplified algorithm. The algorithm obtains a position and compares it to the polygon by establishing a ray from the position constructed in a cardinal direction of the coordinate system. The "polarity" of the count of intersections between the ray and geofence indicates whether the position is inside the geofence or not.

1 Claim, 5 Drawing Sheets

SYSTEM AND METHOD FOR DETERMINING POSITION WITHIN OR WITHOUT A COMPLEX POLYGON GEOFENCE

BACKGROUND OF THE INVENTION

1. Technical Field

The invention relates to geofencing for vehicles, and more particularly, to providing a simplified method for determining if a vehicle's position is within or without an irregular geofence.

2. Description of the Problem

A geofence may be defined in part as a virtual spatial boundary. Geofences are a byproduct of the marriage of mobile, inexpensive telecommunications platforms and data processing systems. They are enhanced in accuracy by making use of global positioning systems which allow accurate, precise determination of the location of both the boundary of a geofence and position of a mobile platform relative to the geofence. A geofence typically operates by triggering of a physical response through the mobile, location sensitive device when the device crosses a boundary, though the system on which the method is implemented may simply operate to note the fact of the crossing to an operator. The spatial location of geofences have commonly been established by selecting a point feature, which may be a point defined by latitude and longitude, and then defining either a radius, or major/minor axis for the point feature, to establish a boundary around the point.

United States Pat. Appl. Pub. 2006/02003005 described construction, using graphical user interface tools, of geofences with boundaries corresponding to real world objects. The area enclosed by such a fence would typically be an irregular polygon, the expression of which might result from simple selection of an object to be enclosed by the fence, such as the campus of a school. An irregular geofence was recognized as more readily applied to real world situations. Among the issues raised with respect to such irregular polygon shaped fences was the difficulty of fully and correctly representing the actual polygon for devices with limited data processing resources. The reference provided the contingency of "decimating" the polygon to avoid overwhelming the resources of such devices.

SUMMARY OF THE INVENTION

According to the invention there is provided a method of determining whether a reported position is within or without a geofence. The method provides the steps of first defining a geofence as a closed circuit of a plurality of straight line boundary segments in a rectangular Cartesian coordinate system. Next, a position is obtained in the rectangular Cartesian coordinate system. A ray is constructed from the position within the rectangular Cartesian coordinate system. Intersections between the ray and the plurality of boundary segments are located. The number of intersections is counted and the position is characterized as within the geofence if the count of intersections is odd and as without the geofence if the count is even. Typically the ray is constructed oriented in a cardinal direction of the rectangular Cartesian coordinate system. Intersections between the ray and boundary segments parallel to the ray are excluded from the count. Boundary segments are defined such that they include only one end point vertex to avoid double counting intersections where the ray passes through a vertex.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
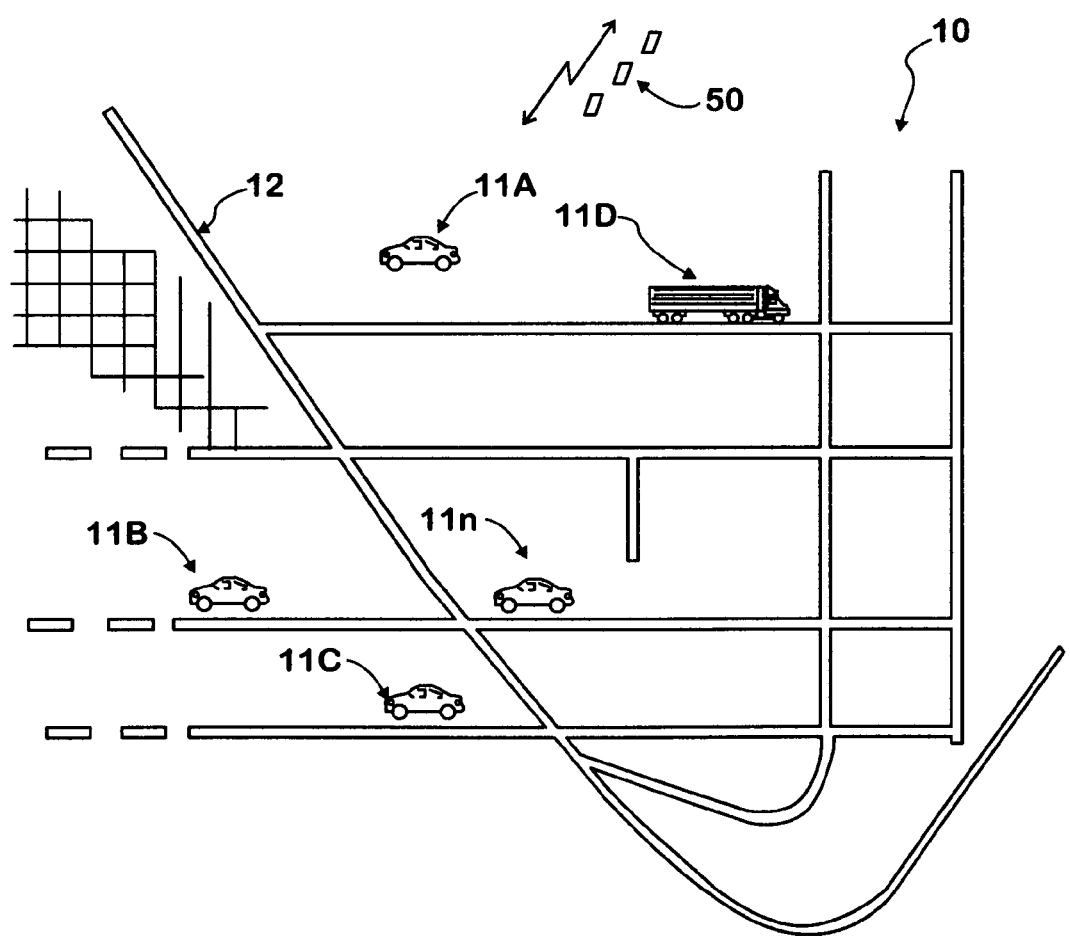
FIG. 1 is a map of a geographic region on which a geofence may be raised.

Referring now to FIG. 1, vehicles 11(A), 11(B), 11(C) . . . 11(n) travel on the road network 12 in the region 10. The vehicles 11 may include cars or trucks. Some or all of the vehicles 11 include suitable equipment that enables them to receive the global positioning information broadcast by global positioning satellite constellation 50. A geofence (not shown) may be erected on region 10 through interaction of data processing equipment on board the vehicles with positioning data, or by response of a central control facility 40 to which the positioning data is reported.

Figure 2:
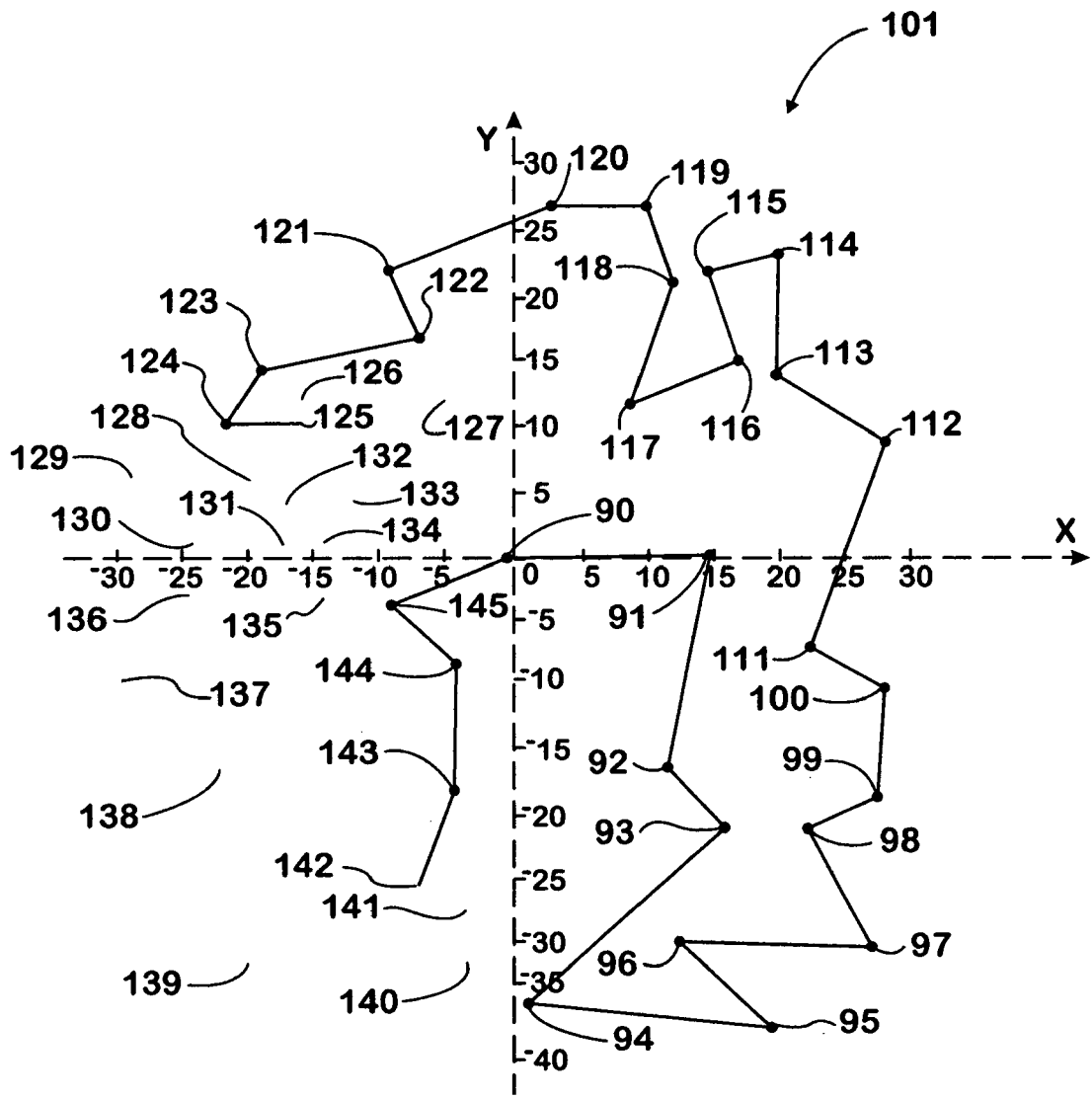
FIG. 2 is a graphical illustration of an irregular polygon corresponding to a possible geofence.

Referring to FIG. 2, a geofence may be an irregular polygon 101 with a plurality of vertices 90-100 and 111-145. The vertices correspond to locations in a coordinate system and are numbered from 0 to N. Typically the coordinate system is terrestrial latitude and longitude and thus is a rectangular Cartesian system with cardinal directions of east, west, north and south (corresponding to the X and Y axes in the graph). The polygon may be convex or concave (as illustrated) and there may be multiple, non-overlapping polygons. Once defined the vertices are ordered sequentially.

Figure 3:
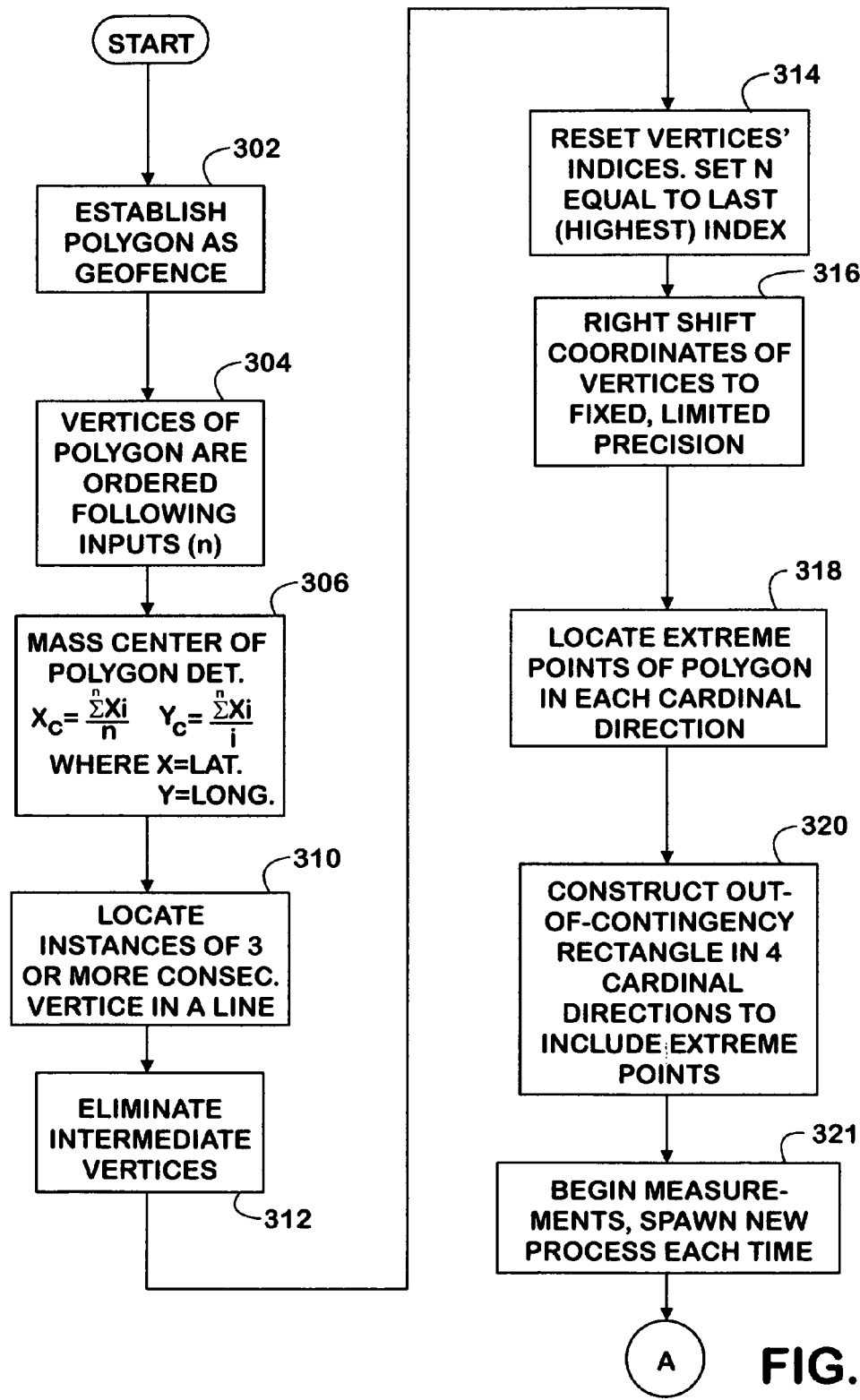
FIG. 3 is a flow chart of an algorithm for determining position in or outside of a geofence.
Figure 4:
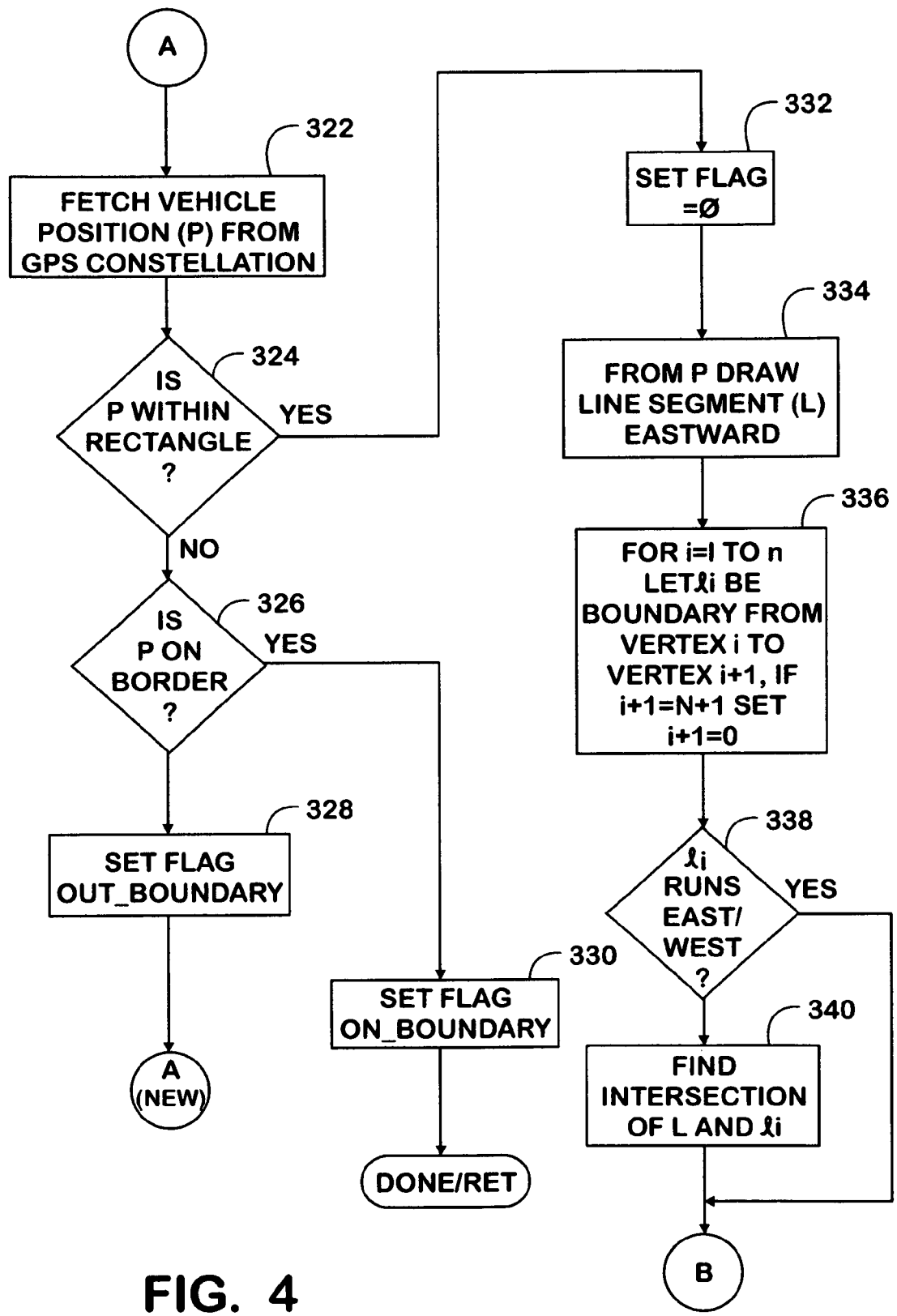
FIG. 4 is a continuation of the flow chart of FIG. 3.
Figure 5:
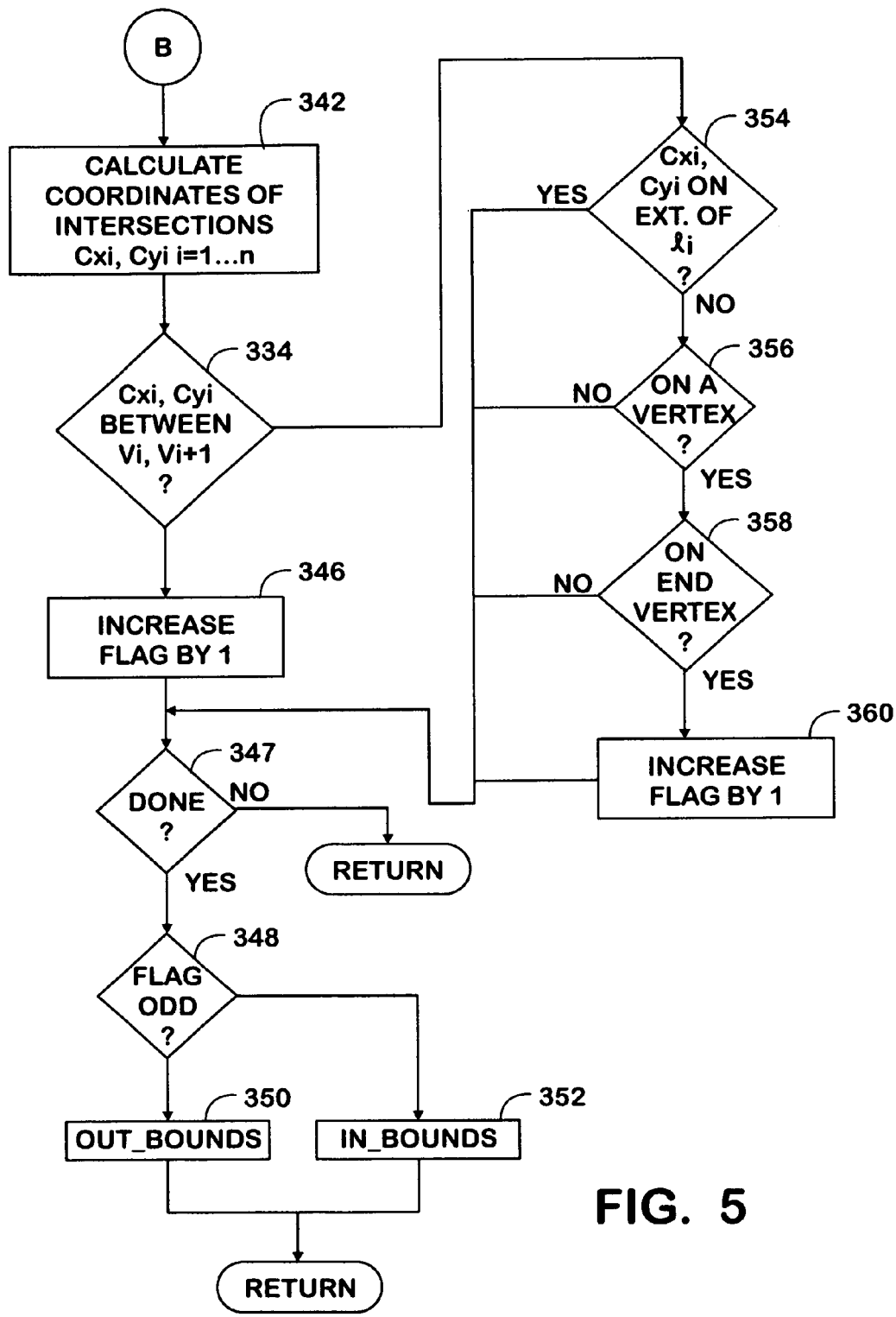
FIG. 5 is a continuation of the flow chart of FIGS. 3 and 4.

Referring now to FIGS. 3-5, the method of the invention is explained with reference to a flow chart. Initially, at step 302, a geofence is defined by a user, typically through a commercial interface or overlay on a map. This may be done by the user simply selecting the vertices on which a polygon is constructed. Once the polygon is defined the vertices of the polygon are ordered (step 304). Next a "mass center" for the polygon is estimated by averaging the coordinate values for the vertices (step 306). The purpose of locating a "mass center" is mathematical simplification, achieved by making the "mass center" the prime coordinates for the polygon (step 308) and recalculating the coordinates for the polygon based on the "mass center". The term "mass center" is not meant to be an exact determination of the literal center of the area but in fact is an average value of the vertices. As noted for step 308 the coordinates for all vertices are recalculated based on the new mass center.

Further simplification is possible. At step 310 the polygon is examined to locate instances of three or more consecutive ordered vertices being located in a straight line. If such instances are found any intermediate vertices (i.e. "vertices" having an angle of 180 degrees) are eliminated. At step 314 the ordering of vertices is reset and the variable N, indicating the number of vertices, is recalculated. At step 316 a further simplification step is taken, by right shifting coordinates to a fixed, limited precision.

With the simplification operations complete, one additional test condition is established. At step 318 the extreme points on the polygon in each cardinal direction are located relative to the origin are found. Next, at step 320, an "out-of-contingency" rectangle is constructed having dimensions based on the extreme points. This rectangle will be used as a quick filter for eliminating some reported positions as possibly being inside the polygon.

Determination of whether a vehicle's position (P) is within or without of a geofence is a new process, spawned for each reading on position taken, as indicated by step 321. At step 322, the position (P) of the vehicle is located from the Global positioning system constellation 50. The position is adjusted using the normalization generated in steps 306 and 308. The adjusted position is readily compared with the boundaries for the out-of-contingency rectangle to determine if the position P is within the rectangle (step 324) and thus possibly inside the polygon. If the position P is not within the rectangle the position is either outside the polygon or on a border segment of the polygon. Following the NO branch to step 326, the position P is checked for correspondence to the border of the polygon. If the position P is not on the border of the polygon it lies outside of the polygon and the NO branch is followed to step 328 where the "Out-of-Boundary" flag is set. Otherwise step 330 is executed to set the "On-Boundary" flag. Following either step 328 or 330 the routine returns the result and is re-executed as determined by the operator's protocol.

If the position P is within the rectangle, that is, within the extreme dimensions of the polygon, more processing is required to determine if the position is within the polygon. Initially a flag or counter is set to zero (step 332). Next, at step 334, a line segment L is calculated from the current (vehicle) position P in a cardinal direction (typically eastward) beyond the maximum extent of the polygon to the east (or in the selected cardinal direction). Typically, the number of intersections between this line segment and the boundary segments of the polygon can be used to determine if position P is within, without or on the boundary. Special provision must be made for the possibility that line segment L passes through one of the vertices or includes all or part of a boundary segment which runs in the same cardinal direction as line segment L.

Steps 336 and following deal with determining the number of intersections between the constructed line segment originating at position P and boundary segments of the polygon. If the number of intersection is odd, it indicates that position P lies within the polygon. If even, the sum indicates that position P lies outside of the polygon. As indicated already, cases where line segment L (or ray) includes all or part of a boundary segment or pass through one of the vertices are handled in a special manner to avoid double counting an intersection between L and a vertex as an intersection with two boundary segments. Essentially each vertex is treated as part of the higher numbered boundary segment only (although the opposite approach could be take). The number of boundary segments connecting vertices of the polygon equals the numbers of vertices and can be numbered j=1 to N+1 with boundary segment j connecting vertices i and i+1 (step 336). For every boundary segment $B_j$ the intersection between the boundary segment and line segment L is found if it exists (step 340). If the line L and a boundary segment run together it is not treated as an intersection. This is dealt with by simply ignoring all boundary segments which run east/west (step 338) which skips step 340 for the noted boundary segments.

At step 342 the coordinates of all the intersections are determined. If, at step 344, the coordinates for a given boundary segment lies between the vertices for the polygon than the flag count is increased by one for that intersection (step 346). Once all boundary segments have been considered (step 347) the flag is examined (step 348) to determine if it is odd, which if it is (the YES path) a within-polygon determination (step 352) results. If the flag is not odd, position P is not within the polygon (step 350). An intersection at a vertex can be considered to count for increasing the flag count. Steps 354, 356 and 358 are used to located intersections between line L and vertices by asking first if the intersection is at a vertex, and in the following two steps if, for the boundary segment under consideration, whether the intersection is at the start or end of the boundary segment. If the intersection comes at the end of a boundary segment than the intersection is counted (step 360), otherwise not.

Those skilled in the art will now appreciate that alternative embodiments of the invention can exist. For example, the flag indicating whether the position P is within or without the geofence could be implemented in ways other than as a counter.

While the invention is shown in one of its forms, it is not thus limited but is susceptible to various changes and modifications without departing from the spirit and scope of the invention.

What is claimed is:

1. A method of locating a position as being within or without a defined geographic area, the method comprising the steps of:
    defining a geofence as a closed circuit of a plurality of straight line boundary segments in a rectangular Cartesian coordinate system to define the geographic area;
    obtaining a position in the rectangular Cartesian coordinate system;
    constructing a ray from the position within the rectangular Cartesian coordinate system;
    locating intersections between the ray and the plurality of line segments;
    counting the number of intersections and characterizing the position as within or without the geofence based on the count, wherein the ray constructing step is done with the ray oriented in a cardinal direction of the rectangular Cartesian coordinate system, wherein the rectangular Cartesian coordinate system is a system of latitude and longitude used for a globe;
    defining boundary segments such that they include only end point vertex;
    locating boundary segments parallel to the ray and excluding any intersections between the ray and parallel boundary segments from the count of intersections;
    locating extreme dimensions of the geofence;
    constructing a rectangle in the rectangular Cartesian space from four boundary segments oriented in the cardinal directions of the rectangular Cartesian space, including the extreme dimensions of the geofence and enclosing the geofence;
    characterizing as outside the geofence any point outside of the rectangle;
    following definition of the geofence, averaging the coordinate values of the vertices of the geofence; and
    setting the average values as the origin of a new coordinate system and resetting all vertices in terms of the new origin, wherein the step of counting further comprises characterizing the position as within the geofence if the count is odd and as without the geofence if the count is even.

* * * * *